United States Patent [19]

Lee

[11] Patent Number: 5,140,629
[45] Date of Patent: Aug. 18, 1992

[54] CALL TRANSFER DEVICE FOR AN AUTOMATIC ANSWERING PHONE USING AN ANSWERING MESSAGE TAPE

[75] Inventor: Seung-ku Lee, Gumi, Rep. of Korea

[73] Assignee: Samsung Electronics Co., Ltd., Suwon, Rep. of Korea

[21] Appl. No.: 501,759

[22] Filed: Mar. 30, 1990

[30] Foreign Application Priority Data

Oct. 17, 1989 [KR] Rep. of Korea ............... 14947-1989

[51] Int. Cl.$^5$ ............................................. H04M 1/64
[52] U.S. Cl. ........................................ 379/70; 379/67; 379/77; 379/88
[58] Field of Search ................. 379/69, 68, 67, 88, 379/87, 70, 74, 77

[56] References Cited

U.S. PATENT DOCUMENTS

| | | | |
|---|---|---|---|
| 3,575,556 | 4/1971 | Wolf et al. | 379/87 |
| 3,786,191 | 1/1974 | Nagasawa et al. | 379/87 |
| 4,065,642 | 12/1977 | McClure | 379/77 |
| 4,518,827 | 5/1985 | Sagara | 379/88 |
| 4,612,416 | 9/1986 | Emerson et al. | 379/88 |
| 4,616,110 | 10/1986 | Hashimoto | 379/88 |
| 4,766,604 | 8/1988 | Axberg | 379/69 |
| 4,873,713 | 10/1989 | Yamanouchi et al. | 379/69 |
| 4,891,834 | 1/1990 | Sezaki et al. | 379/67 |
| 4,891,835 | 1/1990 | Leung et al. | 379/88 |

FOREIGN PATENT DOCUMENTS

| | | | |
|---|---|---|---|
| 0055654 | 4/1982 | Japan | 379/69 |
| 0082851 | 4/1987 | Japan | 379/69 |
| 0242462 | 10/1987 | Japan | 379/69 |

*Primary Examiner*—Stuart S. Levy
*Assistant Examiner*—Joseph A. Rhoa
*Attorney, Agent, or Firm*—Robert E. Bushnell

[57] ABSTRACT

There is disclosed a call transfer method and device of an automatic answering phone, whereby a memory integrated circuit (IC) and a magnetic tape are used to commonly store an answering message, a call transfer message, and a caller's message. The subscriber's message and the call transfer message are recorded in different portions of the same cassette tape for reproducing the answering message.

5 Claims, 4 Drawing Sheets

CALL TRANSFER DEVICE FOR AN AUTOMATIC ANSWERING PHONE USING AN ANSWERING MESSAGE TAPE

BACKGROUND OF THE INVENTION

The present invention generally concerns an automatic answering phone using a device of generating an answering message and, more particularly, a method of making call transfer for elevating the efficiency of the call transfer in an automatic answering phone, by commonly storing an answering message, a call transfer message and a caller's message into a same memory region of a magnetic tape or a semiconductor memory circuitry device.

Conventionally, an automatic answering DP/MFC (Dial Pulse/Multi-frequency Code) telephone employs a microcomputer. By use of the microcomputer, a subscriber stores his message to automatically transmit it to a caller during his absence. Such an automatic answering phone performs several functions including automatically recording a caller's message, transmitting it to the subscriber presently at a different place other than his telephone, automatically dialing via a single button, adjusting the ring intensity, performing a call waiting, etc. Among these several functions, a network of making the call transfer to transmit the caller's message to the subscriber presently at a different place other than his telephone will be briefly described with reference to FIG. 1, which is roughly illustrating the call transfer.

An automatic answering phone 2 is called by a caller's phone 1, and then receives the calling signal through an exchange system 10, so that the automatic answering phone 2 generates a ring signal. If the automatic answering phone 2 is not hooked off (picked up) after a certain number of telephone ringing sounds, it automatically transmits the called subscriber's message to the caller 1, and records the caller's message on a recording tape. Thereafter, if the automatic answering phone 2 is set for the call transfer mode, it automatically calls a second subscriber's telephone 3 at which the first called subscriber is present. Consequently, the second subscriber's telephone 3 rings, and then is hooked off, which is detected by the exchange system 10. If the exchange system 10 transmits to the automatic answering phone 2 the signal that the second subscriber's telephone 3 has been hooked off, then the automatic answering phone 2 transmits the caller's message recorded on the tape of the automatic answering phone 2 to the second subscriber's telephone 3 through the exchange system 10. Namely, the automatic answering phone 2 transfers the caller's message to its subscriber who is present elsewhere. Meanwhile, the subscriber of the automatic answering phone 2 may send a signal identifying himself to the phone 2 by the second subscriber's telephone 3 in order to receive the caller's message from his phone 2. Thus, the call transfer is completed, and the automatic answering phone 2 is ready for the next call.

In such a conventional automatic answering phone, the call transfer message is not distinguished from the subscriber's message for answering the caller and therefore, when the automatic answering phone 2 transmits the call transfer message to the second subscriber's telephone 3 and another person, who is at the second subscriber's telephone 3, than the subscriber of the automatic answering phone 2 receives it, there is caused confusion.

SUMMARY OF THE INVENTION

The object of the present invention is therefore to provide a method of efficiently transferring telephone calls without telephone jam by recording a subscriber's message and call transfer message in different portions of the same memory, thereby reducing the cost of the memory device.

In accordance to one aspect of the present invention, a call transfer method of an automatic answering phone includes the steps of:

establishing a communication line to automatically transmit a subscriber's message to a caller and to store the caller's speech into an automatic answering message tape when receiving a ring signal after which said communication line is interrupted;

stopping the operation of said automatic answering phone if the call transfer mode is not set, or otherwise, moving said answering message tape to the call transfer message portion to store the call transfer message into a messaging memory;

moving again said answering message tape to the portion of the latest message;

establishing a communication line to transmit the call transfer message to said subscriber;

transmitting said latest message through a public telephone network if the subscriber's secret code is inputted, or otherwise interrupting said communication line; and storing again into said messaging memory the message recorded in said answering message tape.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

The present invention will now be described more specifically with reference to the drawings attached only by way of example.

Figure 2:
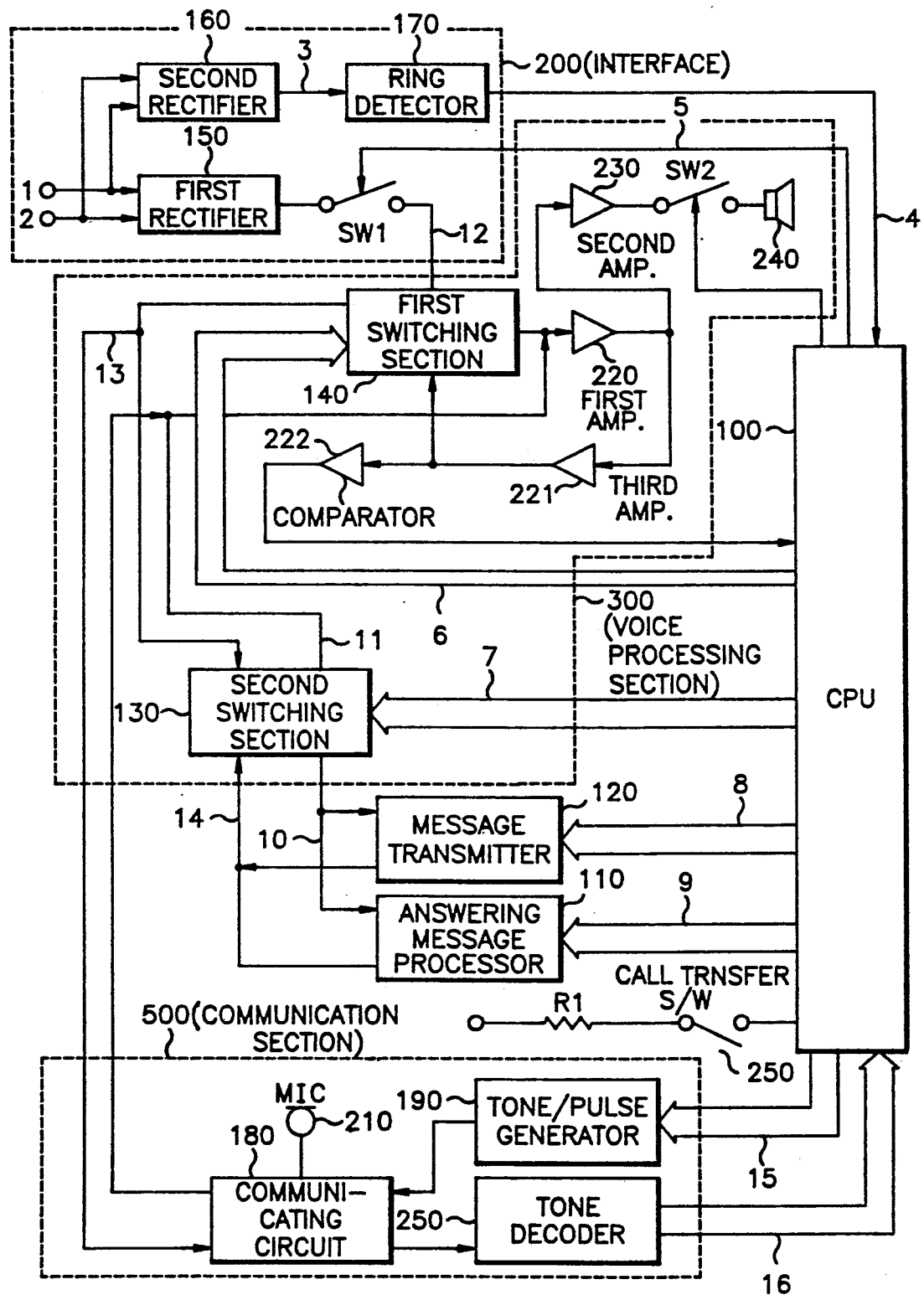
FIG. 2 is a schematic circuit diagram of the automatic answering phone of FIG. 1.

Referring FIG. 2, the circuit of an automatic answering phone includes an interface 200, a voice processing section 300, central processing unit (CPU) 100, answering message processor 110, message transmitter 120, and communication section 500.

The interface 200 includes a first and a second bridge-typed rectifier 150 and 160 respectively connected to communication lines 1 and 2, a ring detector 170 connected to the second bridge-typed rectifier 160, and a first switch $SW_1$ connected to the first bridge rectifying circuit 150.

The voice processing section 300 includes a first switching section 140 connected to the first switch $SW_1$, a first and a second amplifier 220 and 230 for amplifying the output of the first switching section 140, a second switch $SW_2$ for connecting the output of the second amplifier 230 to a speaker 240, a third amplifier 221 connected to the output of the first amplifier 220, the output of the third amplifier 221 being connected to the control terminal of the first switching means 140, a comparator 222 whose input terminal is connected to the output of the third amplifier 221, and a second switching section 130 connected to the output of the first switching section 140.

The call transfer signal of a call transfer switch 250, the output of the ring detector 170, and the output of the comparator 222 are sent into the central processing unit 100. The CPU 100 controls the first and the second switch $SW_1$ and $SW_2$, and the first and the second switching section 130 and 140. The CPU 100 also controls the answering message processor 110 to record and read out the answering message. The message transmitter 120 converts the analog signal of a voice into a digital signal, records and reads out the data of the digital signal, and again converts the digital signal into an analog signal to transmit it.

The communication section 500 includes a communicating circuit 180 including a microphone 210 connected to the input and output terminals of the second switching section 130, and a tone/pulse generator 190 and a tone decoder 205 which are connected to the communicating circuit 180. Of course, communicating section 500 is controlled by the CPU 100.

Figure 3:
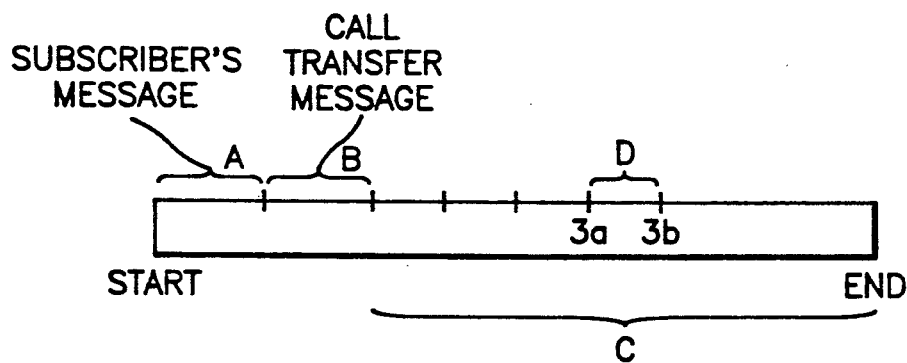
FIG. 3 illustrates the construction of a voiced message tape according to the present invention.

Referring FIG. 3 for illustrating the construction of a voiced message tape according to the present invention, the subscriber's message is recorded in portion A, and the call transfer message in portion B. In portion C, point 3a indicates the starting point of the latest message, and point 3b the end of the answering message.

Figure 4A:
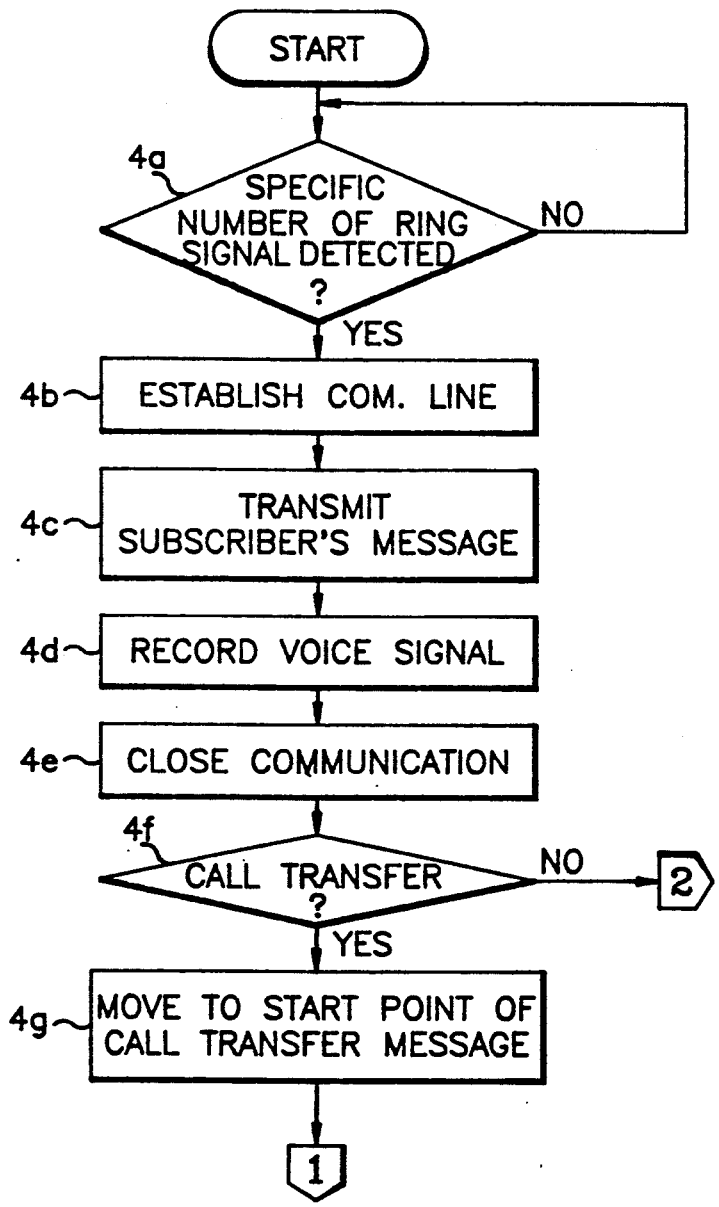
FIGS. 4a–4b are a flowchart of the inventive method.
Figure 4B:
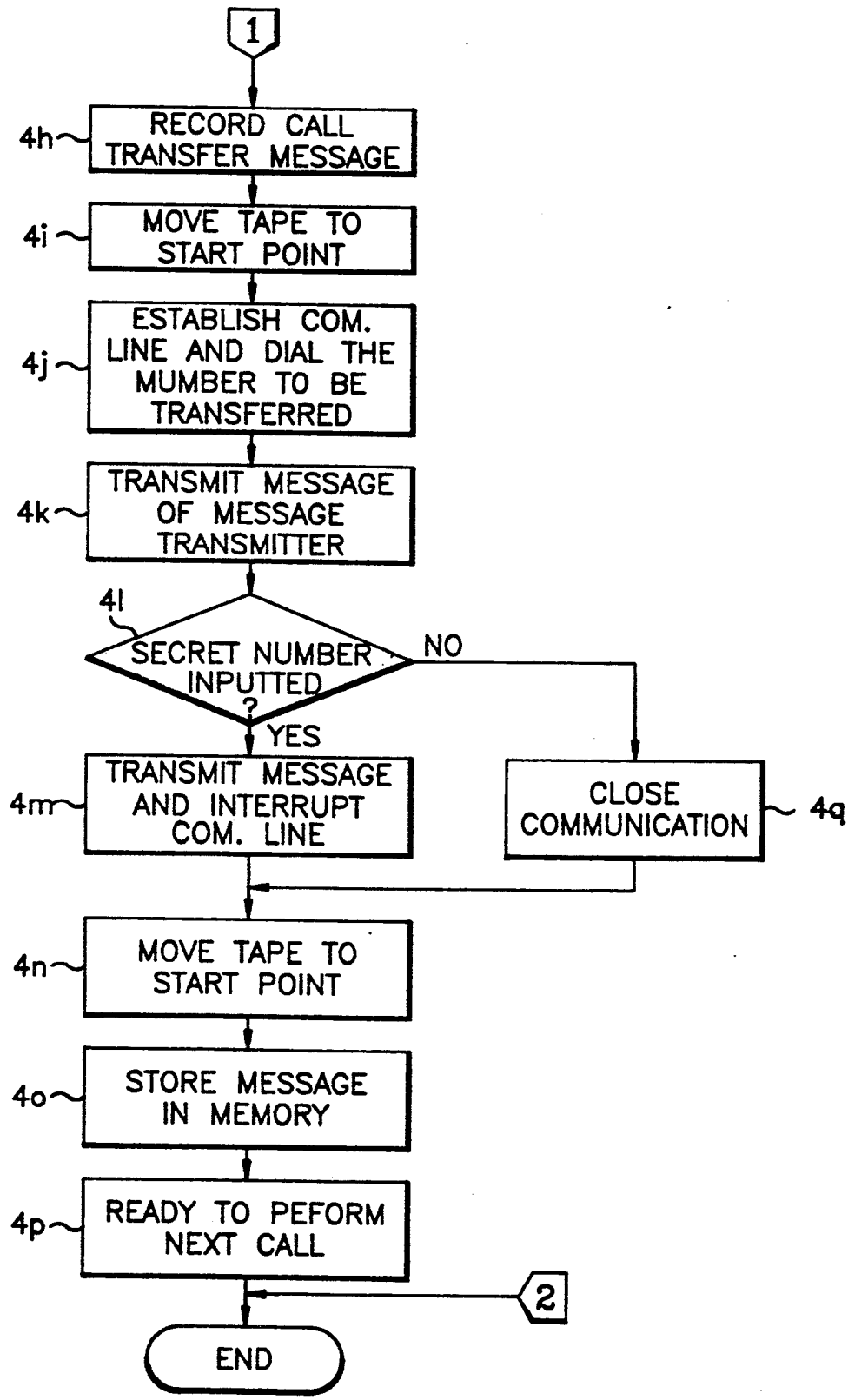

FIGS. 4a and 4b are flow charts for illustrating the inventive method, which comprises the steps of:

establishing a communication line to automatically transmit a subscriber's message to a caller and to store the caller's speech into an answering message tape when receiving a ring signal, after which said communication line is interrupted;

stopping the operation of said automatic answering phone if the call transfer mode is not set, or otherwise, moving said answering message tape to the call transfer message portion to store the call transfer message into a messaging memory;

moving again said answering message tape to the portion of latest message;

establishing a communication line to transmit the call transfer message to said subscriber;

transmitting said latest message through a public telephone network if the subscriber's secret code is inputted, or otherwise interrupting said communication line; and storing again into said messaging memory the message recorded in said answering message tape.

The CPU 100 controls the system of the automatic answering phone according to a control program and data stored therein. The answering message processor 110 records and reads out the answering message under the control of the CPU 100. The message transmitter 120 converts the analog signal of a voice into a digital signal, records and reads out the data of the digital signal, and again converts the digital signal into an analog signal. The second switching section 130 selects one of the message transmitter 120 and the answering message processor 110, which records and reads out the message transmitted successively through the first and the second amplifier 220 and 230 to speaker 140. Meanwhile, a portion of the message is transmitted through the communicating circuit 180 to the first switching section 140, then through the first bridge-typed rectifier 150 to the public telephone network.

The call signal incoming through the public telephone network is inputted through the second bridge-typed rectifier 160 and the ring detector 170 into the CPU 100 to turn on the first switch $SW_1$ to establish a communication line. The voice signal converted by the microphone 210 into an electrical signal is recorded in the message transmitter 120 or the answering message processor 110 through the second switching section 130. Meanwhile, the tone/pulse generator 190 dials a telephone number according to the data received from the CPU, and the dialed signal is transmitted through the communicating circuit 180 to the public telephone network. The dual tone multi-frequency (DTMF) signal incoming through the public telephone network is inputted through the first bridge-typed rectifier 150, the first switching section 140 and the communicating circuit 180 into the tone decoder 205, which converts the signal into binary data inputted into the CPU 100. Hence, if a caller sends a ring signal to the first and second bridge-typed rectifier 150 and 160 through the communication lines 1 and 2, the ring signal rectified by the second bridge-typed rectifier 160 and outputted through the communication line 3 is received by the ring detector 170, which generates the ring detecting signals of a logic state through communication line 4 towards the CPU 100.

With reference to FIG. 2 and FIG. 4, the CPU 100 counts in step 4a the number of ringing as the ring detecting signal. If a given number of the ringing is counted, the CPU 100 turns on the first switch $SW_1$ through line 5 so as to establish a communication line in step 4b. Then, the CPU 100, in step 4c, applies control signals to the first switching section 140, second switching section 130, and message transmitter 120 respectively through bus lines 6, 7 and 8 so as to transmit the subscriber's message recorded in the message transmitter 120 through communication lines 10, 11 and 12 to the public telephone network. Thereafter, the voice signal incoming through the public telephone network is recorded in the cassette tape of the answering message processor 110 through the first bridge-typed rectifier 150 and communication lines 12, 13, 14 according to the control signal of the bus line 9, in step 4d. Then, the CPU 100 turn off the first switch $SW_1$ in step 4e, thereby ending the communication. In this case, if the call transfer switch 250 is turned off, which is checked by the CPU 100 in step 4f, the CPU is ready for the next calling, while if the call transfer switch 250 is turned on, the answering message tape is moved to the starting point of the call transfer message portion (portion B in FIG. 3) in step 4g, and then, the contents of the call transfer message portion are recorded in the message transmitter 120 in step 4h. Of course, the message previously recorded in the message transmitter 120 is erased during the new recording. Subsequently, the CPU 100, in step 4i, transmits a control signal through the bus line 9 so as to move the answering message tape to the starting point of the latest message in the portion C in FIG. 3.

Figure 1:
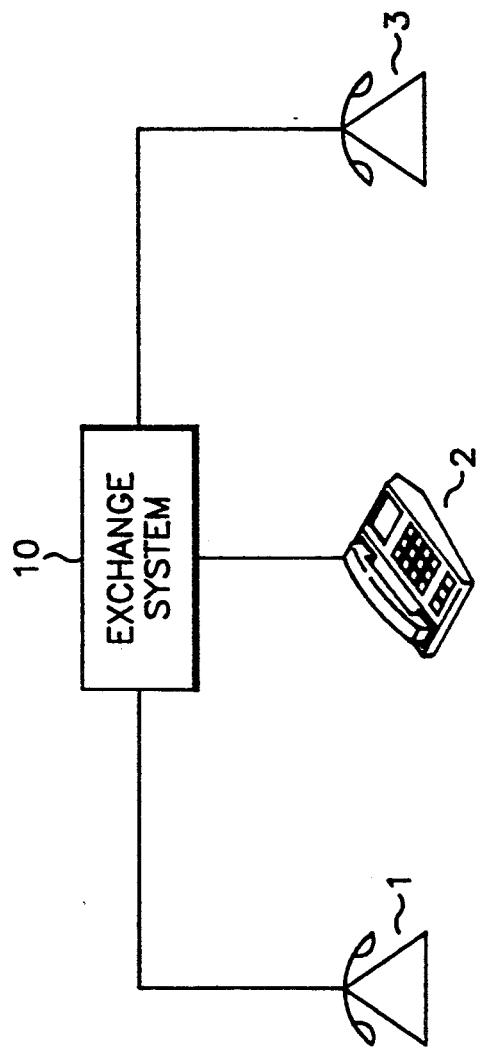
FIG. 1 illustrates the general communication network using an automatic answering phone.

In step 4j, the CPU 100 turns on the first switch $SW_1$ to establish a communication line, and then, applies data and a control signal through the bus line 15 to the tone/pulse generator 190 to dial, through the communicating circuit 180 and first switching section 140, the telephone number where the call is transferred. After dialing, the CPU 100, in step 4k, transmits the message recorded in the message transmitter 120 to the second subscriber's telephone 3 in FIG. 1. Subsequently, the DTMF signal generated by the second subscriber's telephone 3 is transmitted through the first bridge-typed rectifier 150, switch SW₁, first switching section 140 and communicating circuit 180 to the tone decoder 205 which converts the signal into binary data applied through the bus line 6 to the CPU 100. Then, the CPU checks out whether the signal is the first subscriber's secret number or not, in step 4k. If the signal is not the secret number, the communication line is closed, the signal is the secret number, the message of the portion D of FIG. 3 is transmitted through the public telephone network to the second subscriber's telephone 3, and then, the communication line is interrupted, in step 4m.

Finally, the answering message tape is moved to the starting point of the portion A in step 4n. The message of the portion A is stored into the memory IC in step 4o, being ready to transmit the subscriber's message for the next call in step 4p. Then, the answering message tape is moved to the end of the portion C in FIG. 3. Meanwhile, the call transfer message is recorded in the subscriber's message portion B through the microphone 210 in FIG. 2.

As stated above, the present invention uses an answering message tape of low cost instead of a separate memory IC in order to perform the call transfer, so that the production cost is considerably reduced.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A telephone answering machine comprising:
   an interface for detecting an incoming telephone call, for providing ring detection signals to a central processing unit and for establishing a communication line between said telephone answering machine and a caller's telephone after a predetermined number of ring detection signals have been input to said central processing unit;
   an answering machine processor comprising a tape having a subscriber's message portion, a call transfer message portion and a caller's message portion for recording voice signals of a caller;
   a message transmitter for storing a message from one of said message portions of said tape and for transmitting said stored message under control of said central processing unit, wherein said subscriber's message is transmitted from said message transmitter to said caller after said communication line to said caller has been established;
   wherein said voice signals of said caller are recorded into said caller's message portion of said tape after said subscriber's message has been transmitted to said caller;
   a call transfer switch for providing a call transfer signal to said central processing unit when said call transfer switch is set, wherein said central processing unit controls said message transmitter to record said call transfer message from said tape when said call transfer switch is set or controls said telephone answering machine to wait for a next call if said call transfer switch is not set;
   said answering machine processor controls said tape to move to a starting point, in said caller message portion of said tape, of a last recorded message under control of said central processing unit after said message transmitter has recorded said call transfer message;
   a communication section for generating dial tones or dial pulses of a telephone number of a telephone where a message is to be transferred and for decoding received dial tones;
   said central processing unit controls said interface to establish a communication line to said telephone where said message is to be transferred and controls said communication section to dial said telephone number when said call transfer switch is set; and
   wherein said central processing unit controls said message transmitter to transmit said call transfer message to said telephone and controls said answering message processor to transmit said last recorded message to said telephone when dial tones, received in response to said call transfer message and decoded by said communication section, represent a subscriber's secret code.

2. A telephone answering machine comprising:
   an interface for detecting an incoming telephone call, for providing ring detection signals to a central processing unit and for establishing a communication line between said telephone answering machine and a caller's telephone after a predetermined number of ring detection signals have been input to said central processing unit;
   an answering message processor comprising a tape having a subscriber's message portion, a call transfer message portion and a caller's message portion for recording voice signals of a caller;
   a message transmitter for storing a message from one of said subscriber's message portion or said call transfer message portion of said tape and for transmitting said stored message under control of said central processing unit, wherein said subscriber's message is transmitted from said message transmitter to said caller after said communication line to said caller has been established;
   said answering message processor for recording said voice signals of said caller into said caller's message portion of said tape after said subscriber's message has been transmitted to said caller;
   a call transfer switch for providing a call transfer signal to said central processing unit when said call transfer switch is set, wherein said central processing unit controls said message transmitter to record said call transfer message from said tape when said call transfer switch is set or controls said telephone answering machine to wait for a next call if said call transfer switch is not set.

3. The telephone answering machine as claimed in claim 2, wherein said answering message processor controls said tape to move to a starting point, in said caller message portion of said tape, of a last recorded message under control of said central processing unit after said message transmitter has recorded said call transfer message.

4. The telephone answering machine as claimed in claim 3, further comprising:
   a communication section for generating dial tones or dial pulses of a telephone number of a telephone where a message is to be transferred and for decoding received dial tones;

wherein said central processing unit controls said interface to establish a communication line to said telephone where said message is to be transferred and controls said communication section to dial said telephone number when said call transfer switch is set; and wherein said central processing unit controls said message transmitter to transmit said call transfer message to said telephone and controls said answering message processor to transmit said last recorded message to said telephone when dial tones, received in response to said call transfer message and decoded by said communication section, represent a subscriber's secret code.

5. The telephone answering machine as claimed in claim 2, wherein said interface comprises:

a first rectifier and a second rectifier;

a ring detector connected to said second rectifier for providing said ring detection signals to said central processing unit; and a switch connected to first rectifier for establishing said communication channel in response to a control signal from said central processing unit.

* * * * *

UNITED STATES PATENT AND TRADEMARK OFFICE
CERTIFICATE OF CORRECTION

PATENT NO. : 5,140,629
DATED : August 18, 1992
INVENTOR(S) : Seung-Ku Lee

It is certified that error appears in the above-indentified patent and that said Letters Patent is hereby corrected as shown below:

Column 5, line 46, claim 1, change "machine" to --message--.

Signed and Sealed this

Twenty-eighth Day of September, 1993

Attest:

BRUCE LEHMAN

*Attesting Officer*  *Commissioner of Patents and Trademarks*